US012647777B2

(12) United States Patent
Andreasen et al.

(10) Patent No.: US 12,647,777 B2
(45) Date of Patent: Jun. 2, 2026

(54) SECURITY ZONE COMPLIANCE MONITORING IN MOBILE NETWORKS

(71) Applicant: Cisco Technology, Inc., San Jose, CA (US)

(72) Inventors: Flemming Stig Andreasen, Marlboro, NJ (US); Robert Edgar Barton, Richmond (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 406 days.

(21) Appl. No.: 17/979,415

(22) Filed: Nov. 2, 2022

(65) Prior Publication Data

US 2024/0147226 A1 May 2, 2024

(51) Int. Cl.
*H04W 12/033* (2021.01)
*H04W 12/08* (2021.01)
*H04W 12/64* (2021.01)

(52) U.S. Cl.
CPC ......... *H04W 12/033* (2021.01); *H04W 12/08* (2013.01); *H04W 12/64* (2021.01)

(58) Field of Classification Search
CPC ..... H04W 12/06; H04W 76/12; H04W 12/08; H04W 16/10; H04W 4/80; H04W 4/029; H04W 12/63; H04W 4/02; H04W 8/005; H04W 12/068; H04W 84/12; H04W 12/086; H04W 12/069; H04W 12/30; H04W 12/02; H04W 12/03; H04W 12/041; H04W 12/062; H04W 12/12; H04W 12/35; H04W 12/71; H04W 12/72; H04W 12/75; H04W 24/00; H04W 12/65
See application file for complete search history.

(56) References Cited

U.S. PATENT DOCUMENTS

| | | | |
|---|---|---|---|
| 8,588,109 B2 | 11/2013 | Li et al. | |
| 10,743,080 B2 | 8/2020 | Dai et al. | |
| | | (Continued) | |

FOREIGN PATENT DOCUMENTS

| | | |
|---|---|---|
| EP | 3447987 A1 | 2/2019 |
| EP | 3554108 A1 | 10/2019 |

OTHER PUBLICATIONS

"Lawful Intercept Architecture," Cisco, 2022, 14 pages.

(Continued)

*Primary Examiner* — Kwasi Karikari
(74) *Attorney, Agent, or Firm* — Edell, Shapiro & Finnan, LLC

(57) ABSTRACT

In one illustrative example, a controller may operate to send a request message towards a user equipment (UE) which operates to communicate traffic in a session in a mobile network. In response, the controller may receive, from a user plane function which anchors the session of the UE, a response message which includes an identifier of the user plane function. The controller may verify whether a zone or security level value that is assigned to the user plane function matches a zone or security level value that is assigned to the UE. If the controller identifies a discrepancy between the zone or security level values, the controller may provide a notification indication to indicate the discrepancy. The UE may be an industrial Internet of Things (IIoT) device and the zone or security level values may be based on International Electrotechnical Commission (IEC) 62443.

20 Claims, 11 Drawing Sheets

(56) References Cited

U.S. PATENT DOCUMENTS

| | | | |
|---|---|---|---|
| 10,805,401 B2 | 10/2020 | Livanos et al. | |
| 11,392,115 B2 | 7/2022 | Szigeti et al. | |
| 2017/0230832 A1 | 8/2017 | Ophir et al. | |
| 2019/0289020 A1 | 9/2019 | Heintel et al. | |
| 2019/0387401 A1 | 12/2019 | Liao et al. | |
| 2020/0177462 A1 | 6/2020 | Jia et al. | |
| 2020/0275281 A1 | 8/2020 | Bordeleau et al. | |
| 2020/0280499 A1 | 9/2020 | Patil et al. | |
| 2020/0389843 A1 | 12/2020 | Huang et al. | |
| 2021/0014778 A1* | 1/2021 | Xi | H04W 8/26 |
| 2021/0051069 A1 | 2/2021 | Stammers et al. | |
| 2021/0136653 A1 | 5/2021 | Zhang | |
| 2021/0194760 A1 | 6/2021 | Barton et al. | |
| 2021/0250853 A1 | 8/2021 | Corston-Petri et al. | |
| 2021/0400524 A1* | 12/2021 | Kahn | H04L 65/80 |
| 2022/0046484 A1* | 2/2022 | Örtenblad | H04L 67/63 |
| 2022/0225175 A1 | 7/2022 | Srivastava et al. | |
| 2022/0232579 A1 | 7/2022 | Lee | |
| 2022/0255805 A1 | 8/2022 | Hausermann et al. | |
| 2022/0263718 A1 | 8/2022 | Khanfouci | |
| 2022/0263820 A1 | 8/2022 | Barton et al. | |
| 2022/0321467 A1 | 10/2022 | Szigeti et al. | |
| 2022/0386147 A1 | 12/2022 | Majjiga et al. | |
| 2023/0180004 A1* | 6/2023 | Jin | H04W 12/122 |
| | | | 726/6 |

OTHER PUBLICATIONS

Eric Byres, "Using ISA/IEC 62443 Standards to Improve Control System Security," Tofino Security White Paper, Version 1.2, Published May 2014, 12 pages.

"Control Point Discovery Interface Specification," PacketCable™ 2.0, PKT-SP-CPD-102-061013, Oct. 13, 2006, 64 pages.
"LI Support for IPoE Sessions," Cisco, https://www.cisco.com/c/en/us/td/docs/ios-XML/ios/sec_usr_cfg/configuration/xe-16-11/sec-usr-cfg-xe-16-11-book/sec-lawful-intercept-IPoE.pdf, 2019, 4 pages.
"Control Point Discovery (CPD)," Cisco, OL-14657-01, Aug. 21, 2007, 26 pages.
"3rd Generation Partnership Project; Technical Specification Group Services and System Aspects; Procedures for the 5G System (5GS); Stage 2 (Release 17)," 3GPP TS 23.502 V17.4.0, Mar. 2022, 738 pages.
"3rd Generation Partnership Project; Technical Specification Group Services and System Aspects; System architecture for the 5G System (5GS); Stage 2 (Release 17)," 3GPP TS 23.501 V17.4.0, Mar. 2022, 567 pages.
Varga P., et al., "5G Support for Industrial IoT Applications—Challenges, Solutions, and Research Gaps," PMC, https://www.ncbi.nlm.nih.gov/pmc/articles/PMC7038716/">https://www.ncbi.nlm.nih.gov/pmc/articles/PMC7038716/, retrieved Aug. 11, 2022, pp. 1-55.
Cisco, "Wireless Device Profiling and Policy Classification Engine on WLC," https://www.cisco.com/c/en/us/td/docs/wireless/controller/technotes/7-5/NativeProfiling75.html, last updated Nov. 2014, pp. 1-46.
Patil S., et al., "IOT Device Policy Management Framework in 5G/4G Cellular Networks," Technical Disclosure Commons, Defensive Publications Series, https://www.tdcommons.org/dpubs_series/128" title="Link: https://www.tdcommons.org/dpubs_series/128">https://www.tdcommons.org/dpubs_series/128, Jun. 5, 2018, pp. 1-8.

\* cited by examiner

INDUSTRIAL INTERNET OF THINGS (IIOT) DEVICES

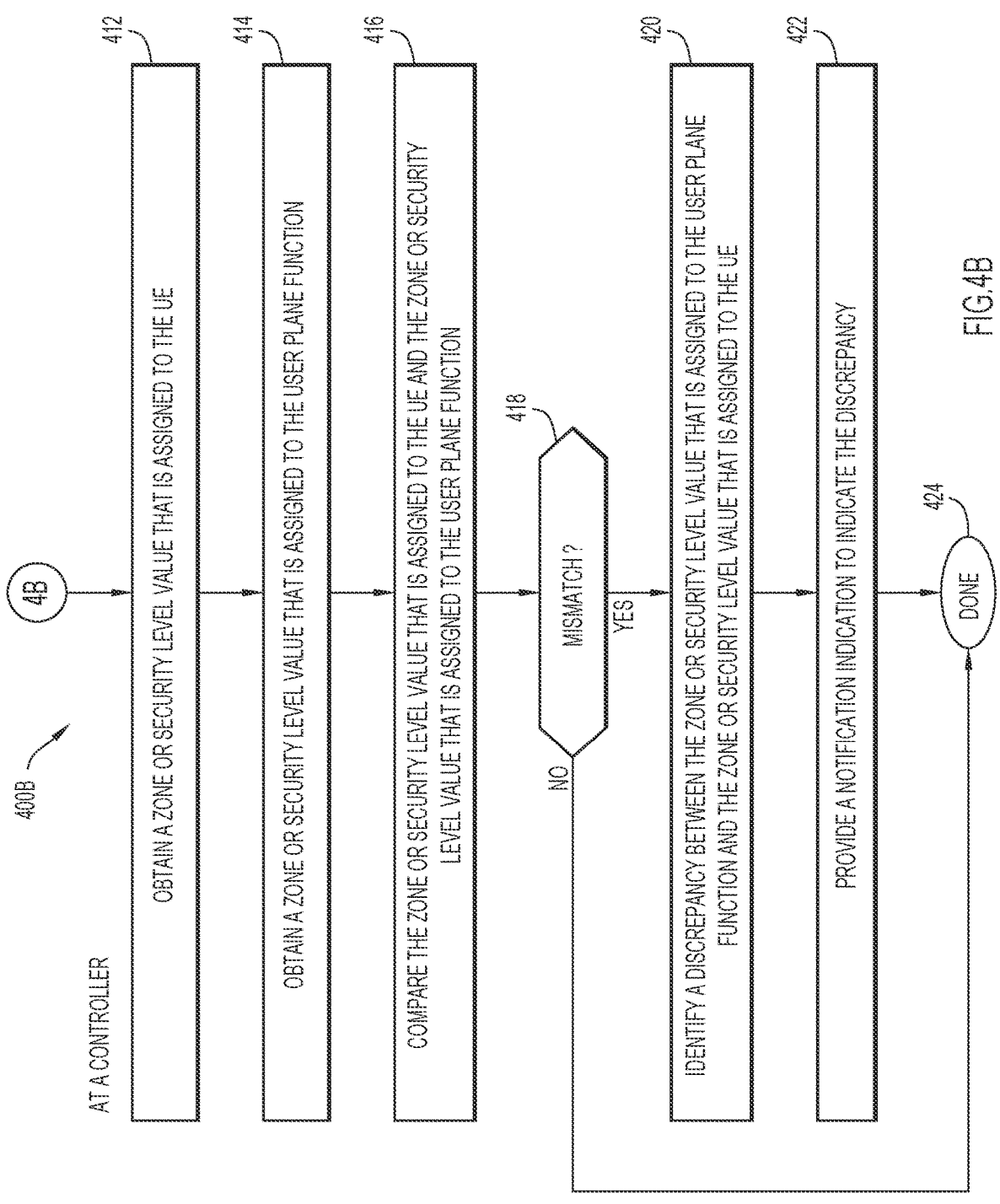

400B

AT A CONTROLLER

OBTAIN A ZONE OR SECURITY LEVEL VALUE THAT IS ASSIGNED TO THE UE — 412

OBTAIN A ZONE OR SECURITY LEVEL VALUE THAT IS ASSIGNED TO THE USER PLANE FUNCTION — 414

COMPARE THE ZONE OR SECURITY LEVEL VALUE THAT IS ASSIGNED TO THE UE AND THE ZONE OR SECURITY LEVEL VALUE THAT IS ASSIGNED TO THE USER PLANE FUNCTION — 416

MISMATCH? — 418

NO

YES

IDENTIFY A DISCREPANCY BETWEEN THE ZONE OR SECURITY LEVEL VALUE THAT IS ASSIGNED TO THE USER PLANE FUNCTION AND THE ZONE OR SECURITY LEVEL VALUE THAT IS ASSIGNED TO THE UE — 420

PROVIDE A NOTIFICATION INDICATION TO INDICATE THE DISCREPANCY — 422

DONE — 424

FIG.4B

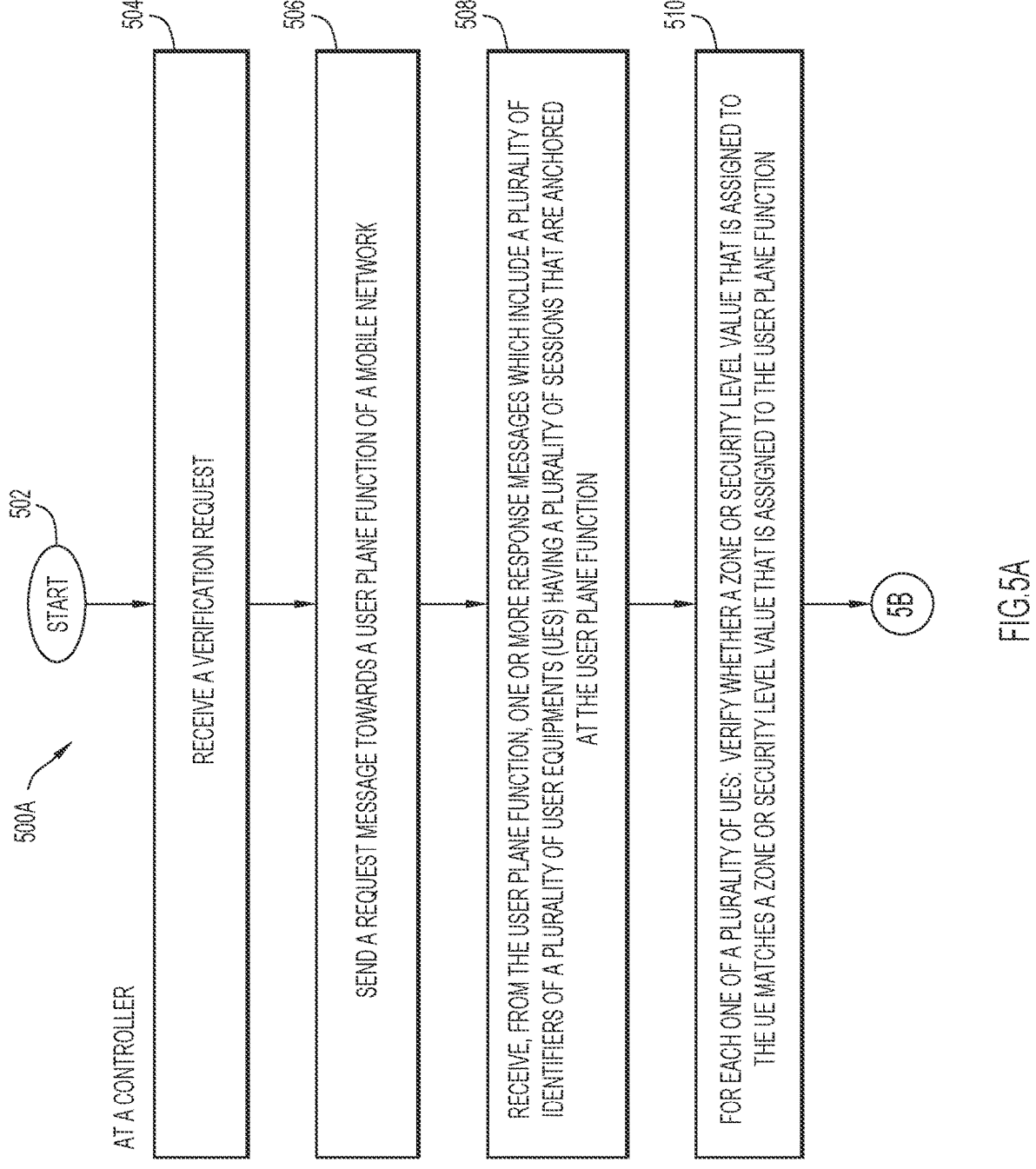

AT A CONTROLLER

START
502

RECEIVE A VERIFICATION REQUEST
504

SEND A REQUEST MESSAGE TOWARDS A USER PLANE FUNCTION OF A MOBILE NETWORK
506

RECEIVE, FROM THE USER PLANE FUNCTION, ONE OR MORE RESPONSE MESSAGES WHICH INCLUDE A PLURALITY OF IDENTIFIERS OF A PLURALITY OF USER EQUIPMENTS (UES) HAVING A PLURALITY OF SESSIONS THAT ARE ANCHORED AT THE USER PLANE FUNCTION
508

FOR EACH ONE OF A PLURALITY OF UES: VERIFY WHETHER A ZONE OR SECURITY LEVEL VALUE THAT IS ASSIGNED TO THE UE MATCHES A ZONE OR SECURITY LEVEL VALUE THAT IS ASSIGNED TO THE USER PLANE FUNCTION
510

SECURITY ZONE COMPLIANCE MONITORING IN MOBILE NETWORKS

TECHNICAL FIELD

The present disclosure relates generally to telecommunications systems, and more particularly to techniques and mechanisms for security zone compliance monitoring in mobile networks, such as industrial Fifth Generation (5G) networks.

BACKGROUND

International Electrotechnical Commission (IEC) 62443 defines an overall security architecture for Operational Technology (OT) networks based on zones and conduits. Devices with similar security (and other) requirements are placed in a zone, and communication with devices in other zones is only allowed through a conduit which implements various security requirements.

When Internet of Things (IoT) or Industrial IoT (IIoT) devices are connected via Fifth Generation (5G) technology, they are anchored on a User Plane Function (UPF) either directly or indirectly, for example, via a 5G router. There may be multiple different UPFs in different zones, and a given UPF may support multiple different devices in different zones.

UPF assignment and subsequent communication between such devices must be performed in accordance with IEC-62443 security requirements. Currently, there is no simple way of auditing and verifying that a given deployment is, in fact, compliant. This is especially problematic in environments that are subject to regulatory compliance.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4B is a flowchart for describing a method for use in a verification process associated with the method of FIG. 4A;

FIG. 5A is a flowchart for describing a method for use in security zone compliance monitoring in mobile networks (e.g., industrial 5G networks) according to some implementations of the present disclosure;

DETAILED DESCRIPTION

Figure 1A:
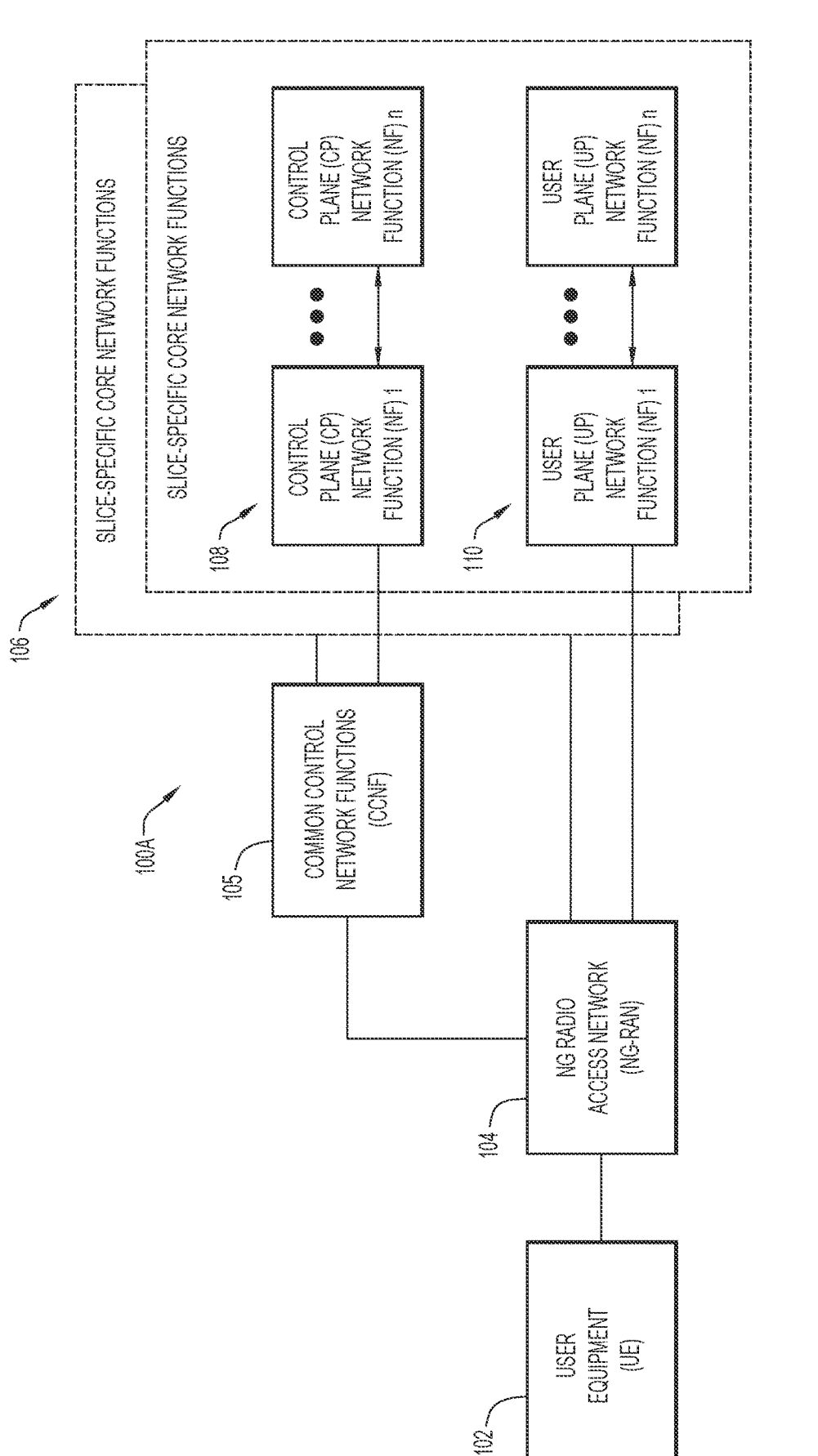
FIG. 1A is an illustrative representation of a basic network architecture of a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms are described herein for security zone compliance monitoring in mobile networks, such as industrial Fifth Generation (5G) networks.

In one illustrative example, a method which may be performed by a controller may involve sending a request message towards a user equipment (UE) which operates to communicate traffic in a session in a mobile network; receiving, from a user plane function which anchors the session of the UE, a response message which includes an identifier of the user plane function; and verifying whether a zone or security level value that is assigned to the user plane function matches a zone or security level value that is assigned to the UE. The method may further involve identifying a discrepancy between the zone or security level value that is assigned to the user plane function and the zone or security level value that is assigned to the UE; and based on the identifying, providing a notification indication to indicate the discrepancy. In some implementations, the method may further involve verifying whether a plurality of active security functions of the user plane function, which are applied in the session of the UE, satisfy a plurality of security requirements of the zone or security level value that is assigned to the UE.

In some implementations, each zone or security level value is or is based on a security level (SL) value which is defined according to International Electrotechnical Commission (IEC) 62443. In some further implementations, the sending the request message towards the UE comprises sending the request message that is addressed to the UE which is comprised of an Internet of Things (IoT) device or an industrial IoT (IIoT) device. In some implementations, the request and response messages are communicated based on a control point discovery (CPD) protocol.

In some implementations, the response message from the user plane function may include the zone or security level value that is assigned to the user plane function. In other implementations, the method may further involve obtaining, from a repository function or an identity services engine, the zone or security level value that is assigned to the user plane function. In some implementations, the method may further involve obtaining, from the subscriber database or the identity services engine, the zone or security level value that is assigned to the UE.

In some implementations, the method may further involve receiving, from a user terminal, a message indicating a verification request for the UE, and performing the sending, the receiving, and the verifying in response to the verification request. In some other implementations, the method may involve automatically performing the sending, the receiving, and the verifying for each one of a plurality of UEs.

In another illustrative example, a method which may also be performed by a controller may involve sending a request message towards a user plane function of a mobile network; receiving, from the user plane function, one or more response messages which include a plurality of identifiers of a plurality of UEs having a plurality of sessions that are anchored at the user plane function; and for each one of the plurality of UEs: verifying whether a zone or security level value that is assigned to the UE matches a given zone or security level value that is assigned to the user plane function. The method may further involve identifying a discrepancy between the zone or security level value that is assigned to the UE and the given zone or security level value that is assigned to the user plane function; and based on the identifying, providing a notification indication to indicate the discrepancy. In some implementations, the method may further involve verifying whether a plurality of active security functions of the user plane function satisfy a plurality of security requirements of the zone or security level value that is assigned to the UE.

In some implementations, the UE may be an IoT or IIoT device. In some implementations, the zone or security level value that is assigned to the user plane function is or is based on an SL value which is defined according to IEC 62443.

In some implementations, the one or more response messages from the user plane function include the zone or security level value that is assigned to the user plane function. In some implementations, for each one of the plurality of UEs, the method may further involve obtaining, from a subscriber database or an identity services engine, the zone or security level value that is assigned to the UE.

In some implementations, the method may further involve receiving, from a user terminal, a message indicating a verification request for the user plane function, and performing in response to the request the sending, the receiving, and the verifying. In other implementations, the method may involve automatically performing the sending, the receiving, and the verifying.

In relation to the above-described methods, a computing device may comprise one or more processors; one or more memory elements coupled to the one or more processors; one or more interfaces to connect to a mobile network for communication; instructions stored in the one or more memory elements, where the instructions are executable on the one or more processors for operation as a controller, including for performing the processing/messaging steps of the method(s) as described. In addition, a computer program product may comprise a non-transitory computer readable medium and instructions stored in the non-transitory computer readable medium, where the instructions are executable by one or more processors of controller for performing the processing/messaging steps of the method(s) as described.

More detailed and alternative techniques and implementations are provided herein as described below.

Example Embodiments

FIG. 1A is an illustrative representation of a general network architecture 100A of a Fifth Generation (5G) network. The 5G network may be referred to more generally herein as a mobile network or a Third Generation Partnership Project (3GPP) based mobile network.

As illustrated in FIG. 1A, network architecture 100A of the 5G network includes common control network functions (CCNF) 105 and a plurality of slice-specific core network functions 106. With network architecture 100A, the 5G network may be configured to facilitate communications for a UE 102. UE 102 may obtain access to the 5G network via a radio access network (RAN) or a Next Generation (NG) RAN (NG-RAN) 104. NG-RAN 104 may include one or more base stations or gNodeBs (gNBs), such as a gNB 107. UE 102 may be any suitable type of device, such as a cellular telephone, a smart phone, a tablet device, an Internet of Things (IoT) device, an Industrial IoT (IIoT) device, a Machine-to-Machine (M2M) device, a sensor, etc.

Network architecture 100A of the 5G network includes a Service-Based Architecture (SBA) which may provide a modular framework from which common applications can be deployed using components of varying sources and suppliers. The SBA of the 5G network may be configured such that control plane functionality and common data repositories are provided by way of a set of interconnected NFs, each with authorization to access each other's services.

Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an Access and Mobility Management Function (AMF) and a Network Slice Selection Function (NSSF). UE-level mobility management, authentication, and network slice instance selection are examples of functionalities provided by CCNF 105. On the other hand, slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a Session Management Function (SMF), whereas UP NFs 110 may include, for example, a User Plane Function (UPF).

Figure 1B:
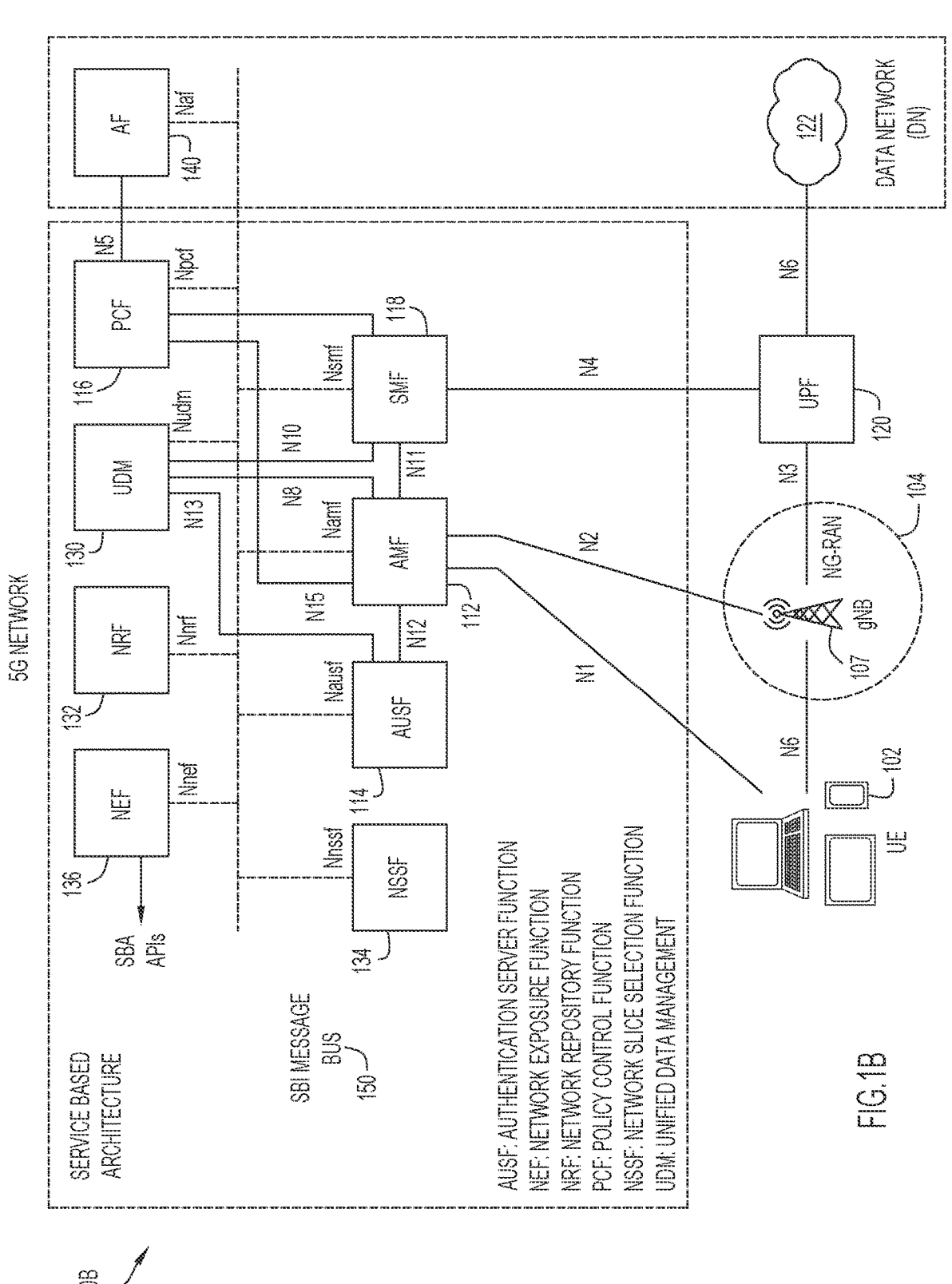
FIG. 1B is an illustrative representation of a more detailed network architecture of the 5G network of FIG. 1A.

FIG. 1B is an illustrative representation of a more detailed network architecture 100B of the 5G network of FIG. 1A. As provided in 3GPP standards for 5G (e.g., 3GPP Technical Specification or "TS" 23.501 and 3GPP TS 23.502), network architecture 100B for the 5G network may include an AMF 112, an Authentication Server Function (AUSF) 114, a Policy Control Function (PCF) 116, an SMF 118, and a UPF 120 which may connect to a Data Network (DN) 122. Other NFs in the 5G network include an NSSF 134, a network exposure function (NEF) 136, an NF repository function (NRF) 132, and a UDM 130. A plurality of interfaces and/or reference points N1-N8, N10-N13, and N15 shown in FIG. 1B (as well as others) may define the communications and/or protocols between each of the entities, as described in the relevant (evolving) standards documents.

In FIG. 1B, UPF 120 is part of the user plane and all other NFs (i.e., AMF 112, AUSF 114, PCF 116, SMF 118, and UDM 130) are part of the control plane. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling. For communications of UE 102 via UPF 120, SMF 118 may maintain a Packet Forward Control Protocol (PFCP) session with UPF 120 over an N4 interface. An N4 connection may be established for every Protocol Data Unit (PDU) session that is created by UE 102 so that SMF 118 may control the session.

The SBA of the 5G network is better illustrated in FIG. 1B, again whereby the control plane functionality and common data repositories are provided by way of the set of interconnected NFs. Assuming the role of either service consumer or service producer, NFs may be self-contained, independent and reusable. With the SBA, each NF service may expose its functionality through a Service Based Interface (SBI) message bus 150. SBI message bus 150 may employ a Representational State Transfer (REST) interface (e.g., using Hypertext Transfer Protocol "HTTP" 2.0). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and a Naf for an application function (AF) 140.

Network slicing brings a high degree of deployment flexibility and efficient resource utilization when deploying diverse network services and applications. NSSF 134 may facilitate network slicing in the 5G network, as it operates to select network slice instances (NSIs) for UEs. A logical, end-to-end network slice may have predetermined capabilities, traffic characteristics, and service level agreements (SLAs), and may include the virtualized resources required to service the needs of a Mobile Virtual Network Operator (MVNO) or group of subscribers, including a dedicated UPF 120, SMF 118, and PCF 116.

UDM 130 may provide services to SBA functions, such as AMF 112, AUSF 114, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context. AUSF 114 provides for authentication, and may rely on a backend service for computing authentication data and keying materials.

NRF 132 may store and/or maintain NF profiles of available NF instances and their associated services, and support a service discovery function for service discovery associated with the NF profiles. In general, an NF instance is an identifiable instance of an NF. NF profiles of NF instances maintained in NRF 132 may include NF instance ID, NF type (e.g., AMF, SMF, PCF, UPF, etc.), network slice identifiers such as NSI ID, NF capacity information, names of supported services, etc. For service discovery, NRF 132 may receive a discovery request from an NF instance and provide information associated with the discovered NF instance to the NF instance in response. As described further herein, an NRF may store and/or maintain zone or security level values in association with UEs and/or UPFs as well as other related information.

One or more application functions, such as AF 140, may connect to the 5G network. AF 140 may interact with the network via NEF 136 in order to access network capabilities. NEF 136 may securely expose network capabilities and events provided by NFs to AF 140, and may provide a means for AF 140 to securely provide information to the 5G network.

For enterprises, interest in deploying private 5G networks for "private 5G" is growing. Such enterprise deployments may include mission-critical devices, IoT devices, robotics devices, etc., where application or device-specific Quality of Service (QoS) treatment, latency, and reliability are important considerations.

Figure 2A:
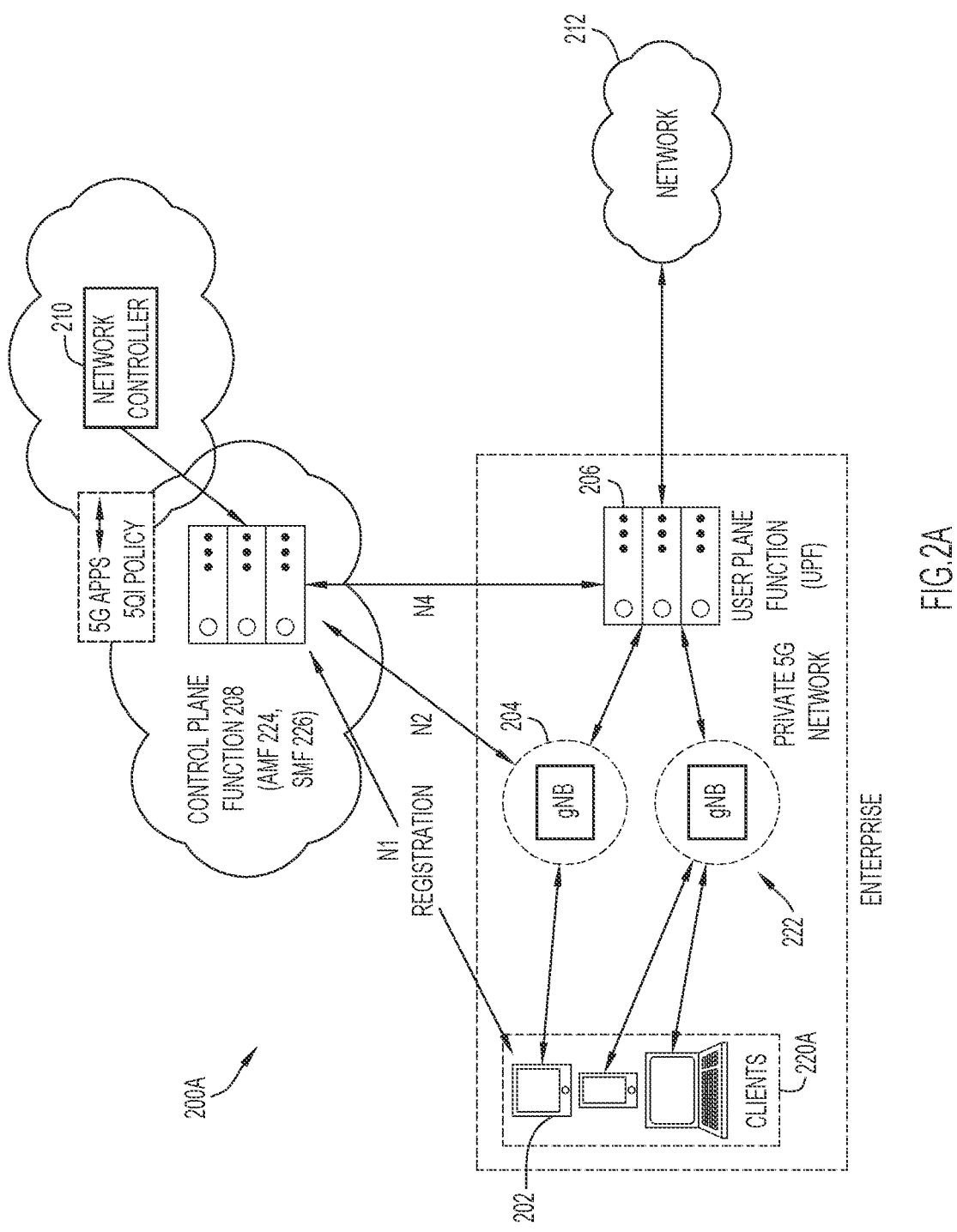
FIG. 2A is an illustrative representation of a basic network architecture of a private 5G network for an enterprise.

In industrial-type private 5G networks ("industrial 5G"), security considerations are of central importance. To illustrate, FIG. 2A is an illustrative representation of a general network architecture 200A of a private 5G network for an enterprise. In general, the private 5G network may utilize the network architecture 200A to facilitate communications for a plurality of clients or UEs 220A, such as a UE 202. Operation, functionality, and protocols utilized in the private 5G network of FIG. 2A may generally conform to 3GPP standards for 5G (e.g., 3GPP TS 23.501 and 23.502), except where specifically adapted for the private enterprise and described herein. A plurality of interfaces and/or reference points N1, N2, and N4 of FIG. 2A are indicative of the protocols and/or the communications between at least some of the entities.

In FIG. 2A, UE 202 may obtain access to the private 5G network via one or more base stations or gNBs 222, such as a gNB 204. A UPF 206 may be used to carry traffic for UE 202. For example, UPF 206 may carry uplink (UL) and downlink (DL) traffic between UE 202 in the private 5G network and a network 212. A control plane function(s) 208 of a control plane may be utilized in the private 5G network for access and mobility management, session management, and/or policy management and control for UEs. In particular, control plane function 208 may include an AMF 224 and an SMF 226 or like functions. In an illustrative example, SMF 226 may manage a protocol data unit (PDU) session of UE 202 that is anchored at UPF 206 over an N4 interface using a Packet Forwarding Control Protocol (PFCP).

In the private 5G context, AMF 224 and SMF 226 may be implemented as separate functions or components, or alternatively provided together as an integrated functionality (in whole or in part) and/or co-located at the same node or component. Other functions may be provided or utilized as well, such as an UDM, an NRF, and Identity Service Engine (ISE), etc. In some implementations, control plane function 208 is provided locally in the private 5G network. In other implementations, control plane function 208 is provided (at least in part) in a cloud infrastructure.

A network controller 210 may also be provided for managing the private 5G network. More specifically, network controller 210 may be provided in the private 5G network for managing and controlling policy and configuration in the private 5G network. In some implementations, network controller 210 is provided locally in the private 5G network. In other implementations, network controller 210 is provided as part of a cloud infrastructure. The cloud infrastructure having network controller 210 may be referred to as a cloud manager or a management cloud. In some implementations, network controller 210 in the cloud infrastructure is operative to provide management and control over policy and configuration according to intent-based networking.

Figure 2B:
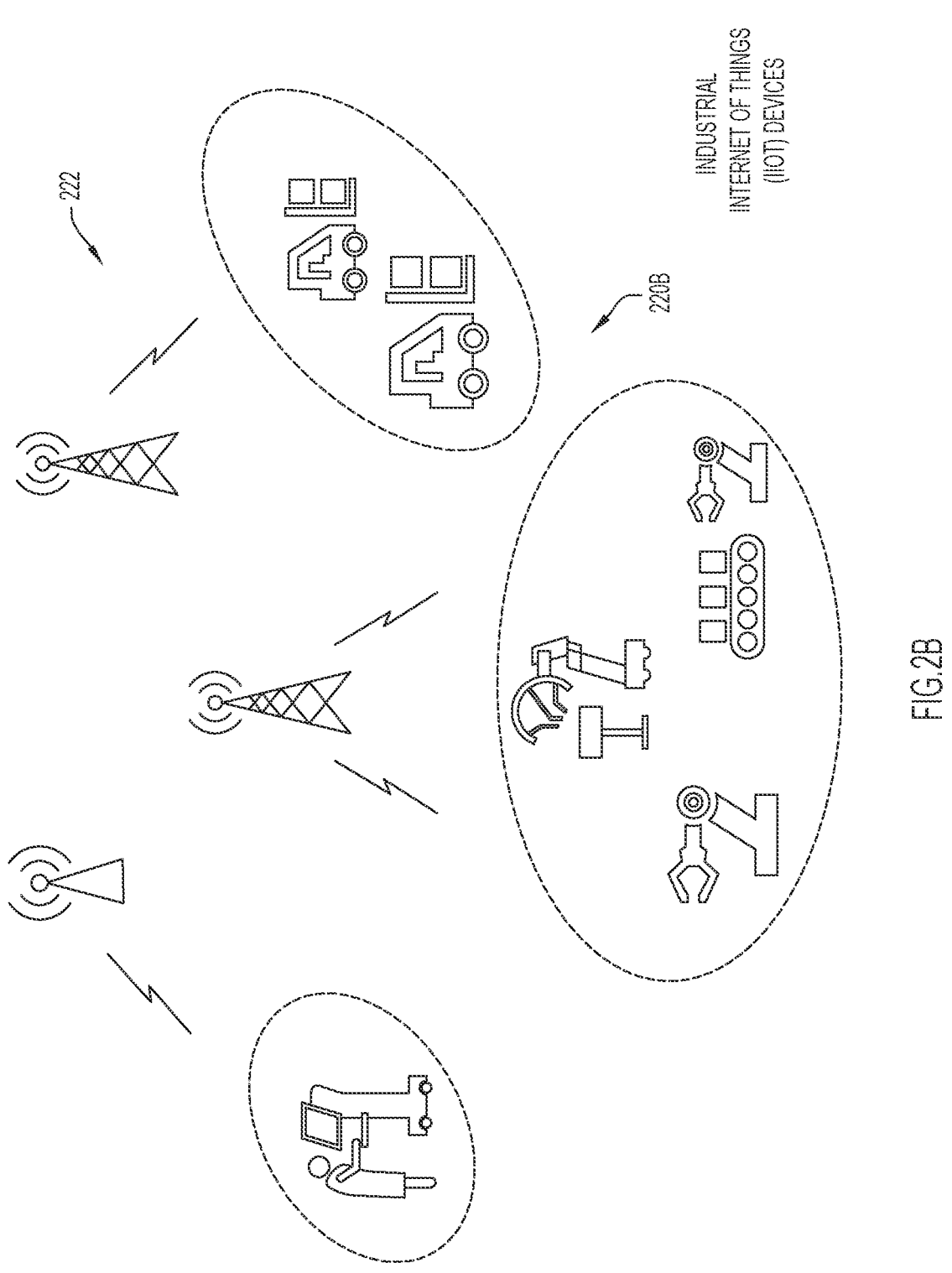
FIG. 2B is an illustrative example of an industrial network environment having a plurality of industrial devices which operate in the private 5G network as part of an industrial control system.

In industrial private 5G networks, the UEs may be or include industrial devices which are part of one or more industrial control systems (ICSs). An example industrial network environment having clients or UEs which are "5G-enabled" industrial devices 220B is shown in the diagram of FIG. 2B. The industrial devices 220B may also be referred to as IoT devices, IIoT devices, cyber assets, security assets, 5G endpoints, etc.

Again, security considerations are of central importance in industrial private 5G networks. Over the years, industrial control systems have experienced a large increase in cyber-attacks. The industry has responded to cybersecurity threats by creating standards to assist users and vendors in the process of securing these systems. These standards may be based on the Purdue model, which is a structural model for industrial control system security that pertains to physical processes, sensors supervisory controls, operations, and logistics. The Purdue model defines different levels of critical infrastructure used in production lines and how to secure them: Level 4/5 is the "enterprise" level; Level 3.5 is the "demilitarized zone (DMZ)" level; Level 3 is the "manu-facturing operations systems" level; Level 2 is the "control systems" level; Level 1 which is the "intelligent device" level; and Level 0 is the "physical process" level.

There are also a number of more specific, key standards available in the market today. International Electrotechnical Commission (IEC) 62443 is a set of security standards for the secure development of Industrial Automation and Con-trol Systems (IACS). IEC 62443 has been developed to improve the safety, availability, integrity, and confidentiality of components or systems used in industrial automation and control. More specifically, IEC 62443 defines an overall security architecture for Operational Technology (OT) net-works based on "zones" and "conduits." A zone may be defined as a group of devices in need of or having the same (or substantially similar) security requirements, and even perhaps a well-defined (physical) border and the need to communicate with each other. A conduit may be defined as a link between different zones for devices that need to communicate to each other, where the link may implement certain security requirements.

Consider a plant having a first production line for welding and a second production line for painting. Here, there is little or no need for devices in the first production line to communicate with devices in the second production line. Thus, the devices in the first production line may be desig-nated to be in a first zone and the devices in the second production line may be designated to be in a second zone. As described, devices having the same or similar security requirements may be provided in the same zone, where communication with devices in another zone is permitted through a conduit which implements certain security requirements. Segmenting the network in this manner (i.e., into different zones) may contain any damage caused by attacks to the network.

In IEC 62443, technical requirements for products (IEC 62443-4-2) and systems (IEC 62443-3-3) are evaluated based on Security Levels (SLs). These different levels indicate the level of resistance against different classes of attackers. The IEC standard emphasizes that the levels are not suitable for the general classification of products but rather should be evaluated per technical requirement (see, e.g., IEC 62443-1-1). In the IEC 62443 standard, the levels include Security Level which is associated with no special requirement or protection required; Security Level 1 which is associated with protection against unintentional or acci-dental misuse; Security Level 2 which is associated with protection against intentional misuse by simple means with few resources, general skills and low motivation; Security Level 3 which is associated with protection against inten-tional misuse by sophisticated means with moderate resources, system-specific knowledge and moderate moti-vation; and Security Level 4 which is associated with protection against intentional misuse using sophisticated means with extensive resources, system-specific knowledge, and high motivation.

When industrial devices are connected via 5G technology, they are anchored on a UPF either directly or indirectly, for example, via a 5G router. There may be multiple different UPFs in different zones, and a given UPF may support multiple different devices in different zones. UPF assign-ment and subsequent communication between such devices must be performed in accordance with IEC-62443 security requirements.

Figure 3A:
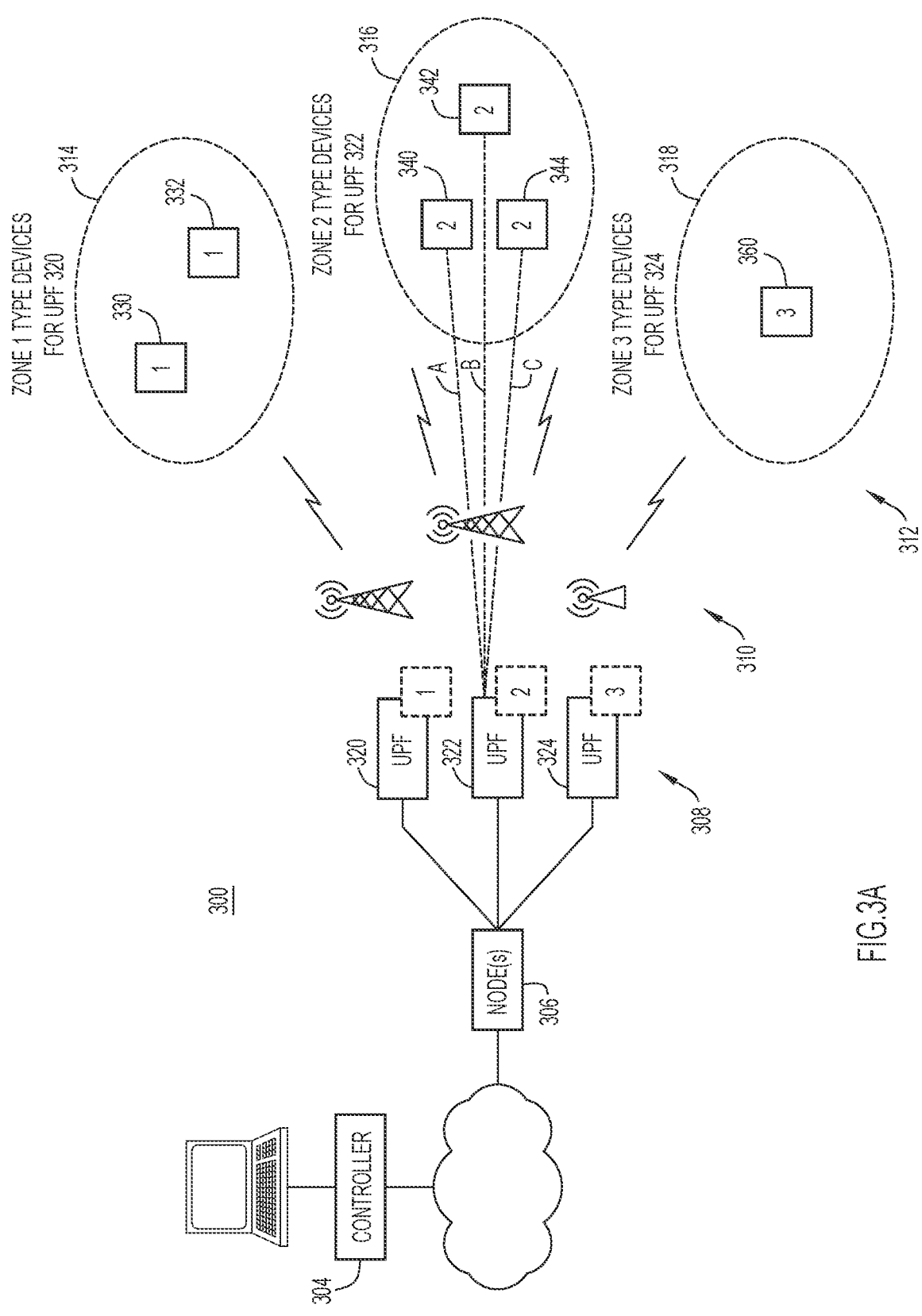
FIGS. 3A and 3B are illustrative representations of relevant nodes of a private 5G network having a plurality of industrial devices which may operate as part of an industrial control system.
Figure 3B:
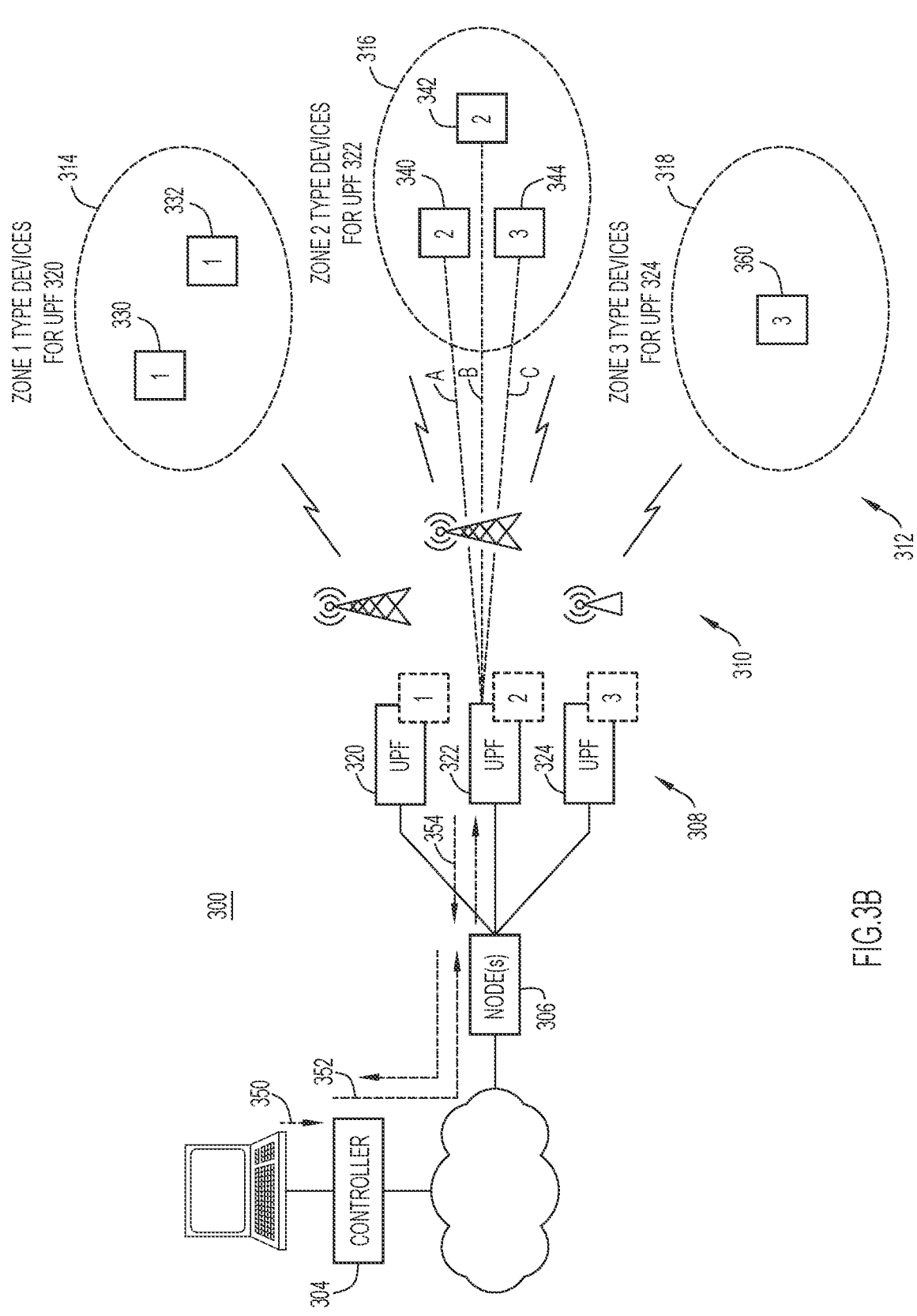

To better illustrate, FIGS. 3A and 3B are illustrative representations of relevant nodes of a private 5G network 300 having a plurality of industrial devices 312 which may operate as part of an industrial control system. Private 5G network 300 may have a network infrastructure which is based on the network architecture of FIGS. 1A-1B and/or 2A-2B. Private 5G network 300 may also have a security architecture which is based on IEC-62443 or other suitable security standard.

In FIG. 3B, the plurality of industrial devices 312 (e.g., UEs, 5G endpoints, IoT devices, IIoT devices, etc.) may operate and communicate in the private 5G network 300 via one or more base stations 310 or access points (e.g., gNBs or the like). Each one of the industrial devices 312 may have certain security requirements. Thus, each one of the indus-trial devices 312 may be assigned with a particular zone or security level value. A zone may be defined as a group of devices in need of the same (or substantially similar) secu-rity requirements. In some implementations, a zone or security level value may be assigned to each industrial device based on a device type (e.g., an industrial device type of industrial device) or a network type (e.g., an industrial network type of industrial network). As illustrated in FIG. 3A, the plurality of industrial devices 312 include a grouping 314 of industrial devices 330 and 332 which are assigned to Zone 1, a grouping 316 of industrial devices 340, 342, and 344 which are assigned to Zone 2, and a grouping 318 of industrial device 360 which is assigned to Zone 3.

Again, the industrial devices 312 may operate and com-municate in the private 5G network 300 via one or more base stations 310. Here, one of a plurality of UPFs 308 (e.g., UPF 320, 322, or 324) may be selected and assigned to carry traffic in a session (e.g., a PDU session) of any given one of the industrial devices 312. Each one of the UPFs 308 may be configured with certain security capabilities or functions, and may be assigned with a zone or security level value based on its security capabilities or functions. Alternatively, each one of the UPFs 308 may be configured with all necessary security capabilities or functions, and apply only a selected subset of one or more of these security capabilities or functions in a session (e.g., a PDU session) depending on the zone or security level value associated with the industrial device.

As indicated in FIG. 3A, UPF 320 is assigned to Zone 1 and has active security functions associated with Zone 1; UPF 322 is assigned to Zone 2 and has active security functions associated with Zone 2; and UPF 324 is assigned to Zone 3 and has active security functions associated with Zone 3. For grouping 316 of industrial devices 340, 342, and 344 that are assigned to Zone 2, industrial device 340 has a PDU session A which is anchored at UPF 322 (Zone 2), industrial device 342 has a PDU session B which is also anchored at UPF 322 (Zone 2), and industrial device 344 has a PDU session C which is also anchored at UPF 322 (Zone 2).

As is apparent, UPF assignment and subsequent communications between industrial devices may be based on IEC-62443 security requirements. Currently, however, there is no simple way of auditing and/or verifying that a given industrial 5G deployment is, in fact, compliant. For example, how can it be verified that a given industrial device is actually assigned to a UPF that belongs to the zone that it is supposed to belong to, and that the assigned UPF actually satisfies the security requirements that are required of it? As another example, how can it be verified that a given UPF serving a zone does not have any industrial devices assigned to it that do not belong to that zone? Note that the above-described lack of auditing and/or verifying in today's industrial 5G is especially problematic for environments that are subject to regulatory compliance.

Figure 4A:
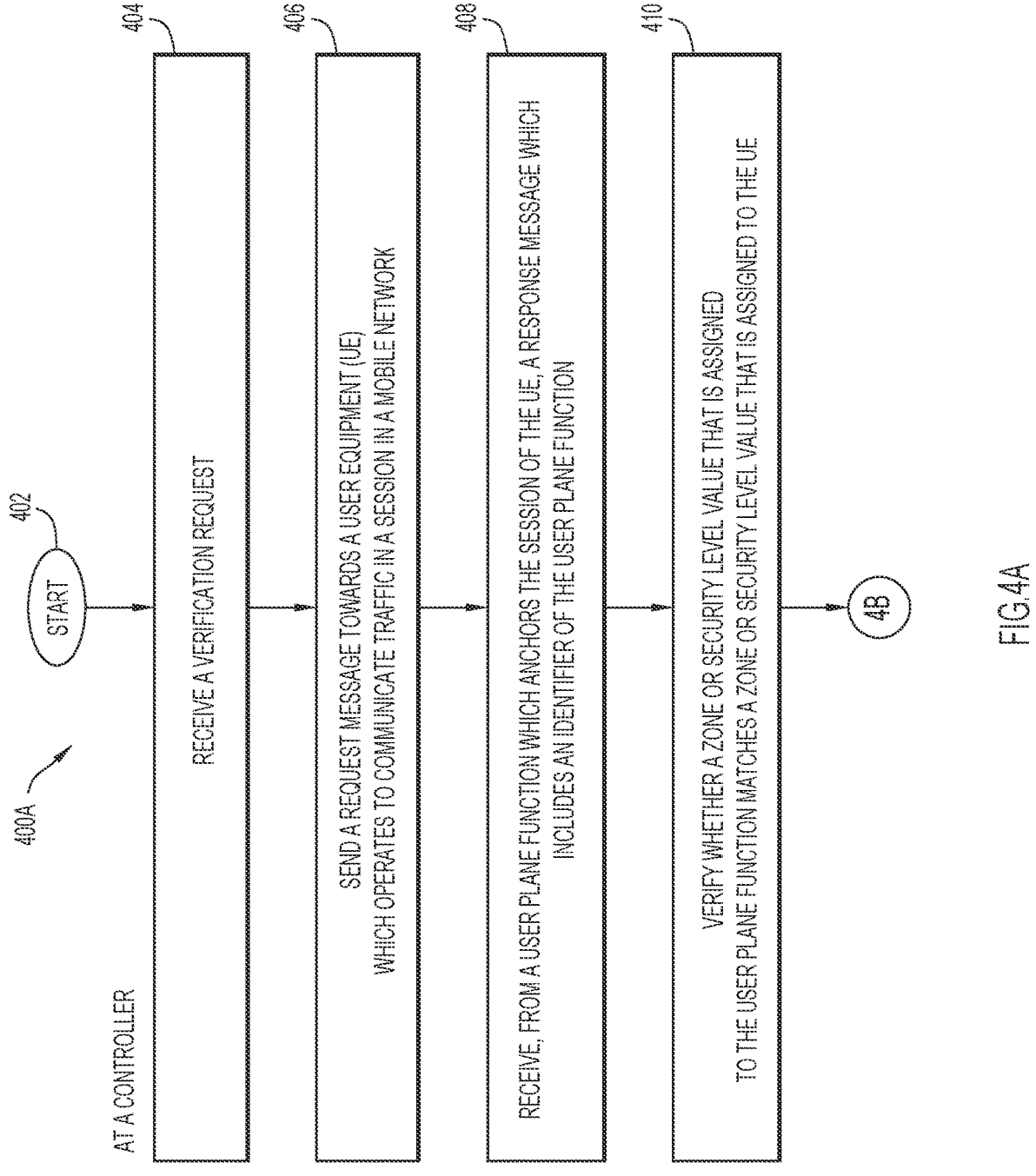
FIG. 4A is a flowchart for describing a method for use in security zone compliance monitoring in mobile networks (e.g., industrial 5G networks) according to some implementations of the present disclosure.
Figure 5B:
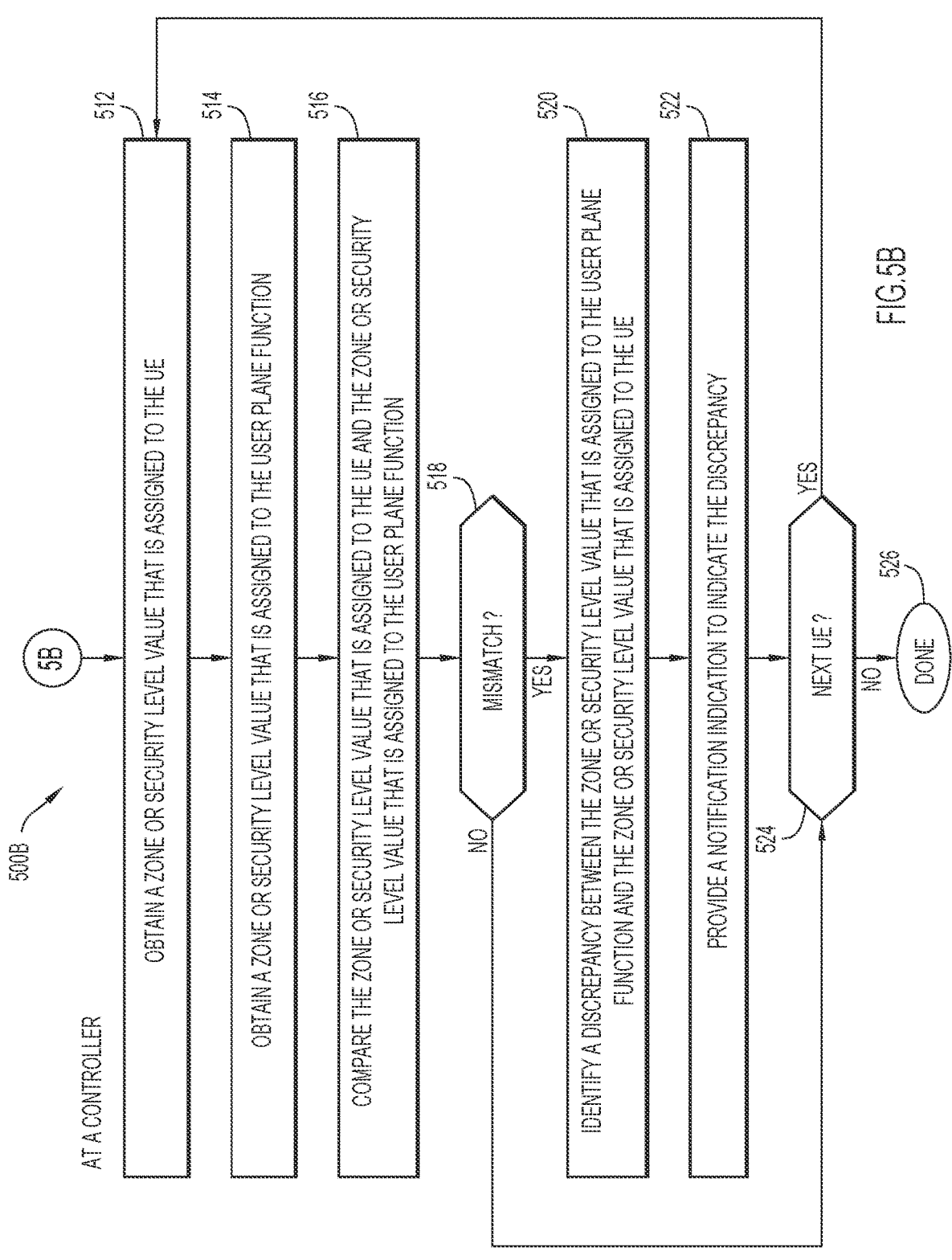
FIG. 5B is a flowchart for describing a method for use in a verification process associated with the method of FIG. 5A.

According to the present disclosure, approaches to the following two (2) general methods are provided:

(1) Audit and/or verify that an industrial device is in fact assigned to a UPF that belongs to the zone it is supposed to and satisfies the security requirements required of it (e.g., the method(s) described in relation to FIGS. 4A-4B); and (2) Audit and/or verify that a UPF serving a particular zone does not have any industrial devices assigned to it that do not belong to that zone (e.g., the method(s) described in relation to FIG. 5A-5B).

Regarding method (1) above, verification of a given industrial device may be generally facilitated as follows:

A. Perform a path trace of traffic to/from the industrial device;

B. Identify the UPF as part of that trace; and

C. Verify that the UPF serves the zone for that industrial device and the UPF provides the necessary security services.

Regarding method (2) above, verification of a given zone may generally be facilitated as follows:

A. Identify the UPF(s) serving that zone; and

B. Determine all the industrial devices that currently have PDU sessions with that UPF. Determine which zone those industrial devices belong to.

Verification of a given industrial device may be further facilitated as follows:

a. In some implementations, the path trace may leverage Control Point Discovery (CPD), which sends a packet towards the industrial device.

b. When the UPF identifies this packet, it intercepts it and responds back to the sender with an identification of the UPF.

c. The UPF serves a given cell/zone, which is indicated in the NRF, along with its associated security services. Alternatively, the UPF may have such information stored in a local system, e.g., in the ISE. If the UPF serves more than one cell/zone, the UPF may indicate which cell/zone it associates the packet with (which cell/zone does the UPF belong to).

d. Similarly, the industrial device belongs to a given zone which is indicated in the UE's profile. The profile of the industrial device may be stored in a local system (e.g., the ISE).

e. A simple audit may then be performed to compare the two zone values.

An approach to method (1) above is now described in more detail in relation to FIG. 4A, which may be for use in auditing and/or verifying that an industrial device is in fact assigned to a UPF that belongs to the zone it is supposed to and satisfies the security requirements required of it.

FIG. 4A is a flowchart 400A for describing a method for use in security zone compliance monitoring in mobile networks according to some implementations of the present disclosure. The method of FIG. 4A may be performed by a controller, which may be or include a computing device which includes one or more processors, one or more memory elements coupled to the one or more processors, one or more interfaces to connect to a mobile network for communication, and instructions stored in the one or more memory elements, where the instructions are executable on the one or more processors for operation as a controller for performing the processing/messaging steps of the method(s) as described. The method of FIG. 4A may also be embodied in a computer program product which includes a non-transitory computer readable medium and instructions stored in the non-transitory computer readable medium, where the instructions are executable by the one or more processors of a controller for performing the processing/messaging steps of the method(s) as described.

Beginning at a start block 402, a controller may receive a verification request for a UE which operates to communicate traffic in a session in a mobile network (step 404 of FIG. 4A). The verification request may be communicated for verifying security zone compliance associated with the UE (e.g., an industrial device). The verification request may include an identifier or an address of the UE. In response to the verification request, the controller may send a request message towards the UE which operates to communicate the traffic in the session in the mobile network (step 406 of FIG. 4A). The request message may be for discovery and/or for tracing for the security zone compliance associated with the UE. In some implementations, the controller may send the request message towards the UE by sending a request message that is addressed to the UE (e.g., in the form of a request packet).

In response to the request message, the controller may receive, from a user plane function which anchors the session of the UE, a response message which includes an identifier of the user plane function (step 408 of FIG. 4A). The session of the UE may be a PDU session which is anchored at the user plane function. The response message from the user plane function may be considered to be a discovery response and/or trace response for verification of the security zone compliance. The user plane function that responds may be the user plane function that is in the path between the controller (i.e., the requestor) and the UE, and/or that anchors the session of the UE. In some implementations, the user plane function operates to intercept the request message that is addressed to the UE and disallows it from reaching the UE (e.g., the user plane function may drop the packet and respond to the controller with a response packet). Based on the response message, the controller may verify whether a zone or security level value that is assigned to the user plane function matches a zone or security level value that is assigned to the UE (step 410 of FIG. 4A). In some implementations, each zone or security level value is or is based on a security level value which is defined according to IEC 62443.

The method of FIG. 4A may continue via a connector 4B in a flowchart 400B of FIG. 4B for describing the verification process. In the verification process, the controller may obtain a zone or security level value that is assigned to the UE (step 412 of FIG. 4B). In some implementations, the controller may obtain the zone or security level value that is assigned to the UE from a subscriber database (e.g., an HSS or a UDM) or an identity services engine (e.g., an ISE). The controller may also obtain a zone or security level value that is assigned to the user plane function (step 414 of FIG. 4B). In some implementations, the zone or security level value that is assigned to the user plane function may be obtained from the response message from the user plane function (i.e., the response message received in step 408 of FIG. 4A). In other implementations, the controller may obtain the zone or security level value that is assigned to the user plane function from a repository function (e.g., an NRF) or the identity services engine (e.g., an ISE) based on the identifier of the user plane function.

The controller may compare the zone or security level value that is assigned to the UE and the zone or security level value that is assigned to the user plane function (step 416 of FIG. 4B). If there is a mismatch between the values (as tested at step 418 of FIG. 4B), then the controller identifies a discrepancy between the zone or security level value that is assigned to the user plane function and the zone or security level value that is assigned to the UE (step 420 of FIG. 4B). Based on the identifying, the controller may provide a notification indication to indicate the discrepancy (step 422 of FIG. 4B). The notification indication may be provided as a visual indication in a visual display, an audible indication in a speaker, a message being sent for receipt in a receiving device, or other suitable indication or alert (see, e.g., the user terminal of controller 304 of FIG. 3A-3B). The notification indication may indicate or highlight one or more of the values associated with the discrepancy and/or any security maintenance actions to be taken. After providing the notification indication is step 422, the flowchart 400B ends at a done block 424. On the other hand, if there is no mismatch between the values at step 418, then the controller does not identify any discrepancy and may refrain from providing the notification indication to indicate any discrepancy (or, e.g., provide an alternative notification indication to indicate compliance), and the flowchart 400B ends at the done block 424.

The user plane function may have a plurality of active security functions which are applied in the session of the UE. In some implementations, in the verification process, the controller may further verify whether the plurality of active security functions of the user plane function satisfy a plurality of security requirements of the zone or security level value that is assigned to the UE. If there is a mismatch between the functions and the requirements, then the controller may identify the discrepancy and provide a notification indication to indicate the discrepancy. The notification indication may indicate or highlight one or more of the functions/requirements associated with the discrepancy and/or any security maintenance actions to be taken. In some implementations, the response message from the user plane function may include the active security functions (i.e., identifiers thereof) of the user plane function. In other implementations, the controller may operate to obtain, from the repository function (e.g., the NRF) or the identity services engine (e.g., an ISE), based on the identifier of the user plane function, the active security functions (i.e., the identifiers thereof) of the user plane function.

In some implementations, the request and response messages may be communicated based on a control point discovery (CPD) protocol. The CPD protocol is an IP-based protocol that has been traditionally used to discover a "control point" for a given IP address. A control point is a network node at which particular functions or operations may be performed in relation to a particular session of an endpoint (e.g., QoS operations, lawful intercept (LI) operations, or other operations). In the CPD protocol, a requestor having the IP address of an endpoint may send a CPD message (i.e., a CPD request message or packet) toward that endpoint. A control point in the path between the requestor and the endpoint may recognize the CPD message and respond back with an IP address of the control point (e.g., in a CPD response message or packet). According to the present disclosure utilizing the CPD or CPD-based protocol, the controller may be configured as the requestor and each user plane function may be configured as a control point. In some implementations, the CPD protocol may utilize a network-layer signaling protocol (NLS). The NLS may consist of an application layer that sits on top of an NLS transport layer (NLS-TL). In other implementations, the CPD or CPD-based protocol may utilize a different network or transport layer signaling protocol. See the *Control Point Discovery Interface Specification*, PacketCable™ 2.0, CableLabs®, Apr. 6, 2006. PacketCable 2.0 and CableLabs are registered trademarks of Cable Television Laboratories, Inc., Louisville, Colorado, U.S.A.

The discussion is now directed back to FIG. 3B, which illustrates the relevant nodes of private 5G network 300 having the plurality of industrial devices 312 operating as part of the industrial control system. FIG. 3B is now utilized to discuss an illustrative example of the method of FIGS. 4A-4B. In FIG. 3B, a controller 304 may receive, from a user terminal, a verification request 350 associated with industrial device 342 which is assigned to Zone 2. Alternatively, the verification request 350 associated with industrial device 342 may be generated within the system, automatically or in response to a trigger (e.g., based on a threat detection, a security check, a timer expiration, each periodic timer expiration, etc.). In response to the verification request 350, controller 304 may send a request message 352 (e.g., a request packet) towards industrial device 342 which operates to communicate traffic in the PDU session B in the private 5G network 300. The request message which is addressed to industrial device 342 may be communicated through one or more network nodes 306 and via UPF 322 which anchors the PDU session B of industrial device 342. When UPF 322 receives the request message 352, UPF 322 intercepts and processes the message. UPF 322 processes the message by generating and sending back a response message 354 to controller 304 (e.g., dropping the request packet). The response message 354 may include an identifier of UPF 322 and, in some implementations, may include the zone value of the UPF 322. Controller 304 may receive the response message 354 and perform a verification process. Here, the zone value of the UPF 322 (i.e., Zone 2) will match the zone value of industrial device 342 (i.e., Zone 2).

As another example in relation to FIG. 3B, controller 304 may receive the verification request 350 associated with industrial device 344 which has security requirements associated with Zone 3, but the PDU session C which is anchored at UPF 322 is assigned to Zone 2 (which is a discrepancy). When controller 304 receives the response message 354 and performs the verification process, the zone value of the UPF 322 (i.e., Zone 2) will be determined to mismatch the zone value of industrial device 344 (i.e., Zone 3) (indicating a discrepancy).

An approach to method (2) above is now described in more detail in relation to FIG. 5A, which may be for use in auditing and/or verifying that a UPF serving a particular zone does not have any industrial devices assigned to it that do not belong to that zone.

FIG. 5A is a flowchart 500A for describing a method for use in security zone compliance monitoring in mobile networks according to some implementations of the present disclosure. The method of FIG. 5A may be performed by a controller, and/or a computing device which includes one or more processors, one or more memory elements coupled to the one or more processors, one or more interfaces to connect to a mobile network for communication, and instructions stored in the one or more memory elements, where the instructions are executable on the one or more processors for operation as a controller for performing the processing/messaging steps of the method(s) as described. The method of FIG. 5A may also be embodied in a computer program product which includes a non-transitory computer readable medium and instructions stored in the non-transitory computer readable medium, where the instructions are executable by the one or more processors of a controller for performing the processing/messaging steps of the method(s) as described.

Beginning at a start block 502, a controller may receive a verification request for a user plane function of a mobile network (step 504 of FIG. 5A). The verification request may be communicated for verifying security zone compliance associated with the user plane function. The verification request may include an identifier or an address of the user plane function. In response to the verification request, the controller may send a request message to or towards a user plane function of a mobile network (step 506 of FIG. 5A). The request message may be for discovery and/or for tracing for the security zone compliance associated with the user plane function.

In response to the request message, the controller may receive, from the user plane function, one or more response messages which include a plurality of identifiers of a plurality of UEs having a plurality of sessions that are anchored at the user plane function (step 508 of FIG. 5A). The UEs may be industrial devices, IoT devices, IIoT devices, etc. The response message(s) from the user plane function may be considered to be a discovery response(s) and/or trace response(s) for verification of the security zone compliance. For each one of the plurality of UEs, the controller may verify whether a zone or security level value that is assigned to the UE matches a given zone or security level value that is assigned to the user plane function (step 510 of FIG. 5A). In some implementations, each zone or security level value is or is based on a security level value which is defined according to IEC 62443.

The method of FIG. 5A may continue via a connector 5B in a flowchart 500B of FIG. 5B for describing the verification process. In the verification process, the controller may obtain a zone or security level value that is assigned to the UE (step 512 of FIG. 5B). In some implementations, the controller may obtain the zone or security level value that is assigned to the UE from a subscriber database (e.g., an HSS or a UDM) or an identity services engine (e.g., an ISE). The controller may also obtain a zone or security level value that is assigned to the user plane function (step 514 of FIG. 5B). In some implementations, the controller may obtain the zone or security level value that is assigned to the user plane function from a repository function (e.g., an NRF) or the identity services engine (e.g., an ISE) based on the identifier of the user plane function.

The controller may compare the zone or security level value that is assigned to the UE and the zone or security level value that is assigned to the user plane function (step 516 of FIG. 5B). If there is a mismatch between the values (as tested at step 518 of FIG. 5B), then the controller identifies a discrepancy between the zone or security level value that is assigned to the user plane function and the zone or security level value that is assigned to the UE (step 520 of FIG. 5B). Based on the identifying, the controller may provide a notification indication to indicate the discrepancy (step 522 of FIG. 5B). The notification indication may be provided as a visual indication in a visual display, an audible indication in a speaker, a message being sent for receipt on a receiving device, or other suitable indication or alert (see, e.g., the user terminal of controller 304 of FIG. 3A-3B). The notification indication may indicate or highlight one or more of the values associated with the discrepancy and/or any security maintenance actions to be taken. On the other hand, if there is no mismatch between the values at step 518, then the controller does not identify any discrepancy and may refrain from providing the notification indication to indicate any discrepancy (or, e.g., provide an alternative notification indication to indicate compliance). If there are more UEs to consider (as tested at step 524 of FIG. 5B), then the verification process selects the next UE and proceeds back to step 512, otherwise the method ends at a done block 526.

Again, the user plane function may have a plurality of active security functions which are applied in the session of the UE. In some implementations, in the verification process of FIG. 5B, the controller may further verify whether the plurality of active security functions of the user plane function satisfy a plurality of security requirements of the zone or security level value that is assigned to the UE. If there is a mismatch between the functions and the requirements, then the controller may identify the discrepancy and provide a notification indication to indicate the discrepancy. The notification indication may indicate or highlight one or more of the functions/requirements associated with the discrepancy and/or any security maintenance actions to be taken. In some implementations, the response message from the user plane function may include the active security functions (i.e., identifiers thereof) of the user plane function. In other implementations, the controller may operate to obtain, from the repository function (e.g., the NRF) or the identity services engine (e.g., an ISE), based on the identifier of the user plane function, the active security functions (i.e., the identifiers thereof) of the user plane function.

The discussion is again directed back to FIG. 3B, which illustrates the relevant nodes of private 5G network 300 having the plurality of industrial devices 312 operating as part of the industrial control system. FIG. 3B is now utilized to discuss an illustrative example of the method of FIGS. 5A-5B. In FIG. 3B, controller 304 may receive, from a user terminal, the verification request 350 associated with UPF 322 which is assigned to Zone 2. Alternatively, the verification request 350 associated with UPF 322 may be generated within the system, automatically or in response to a trigger (e.g., based on a threat detection, a security check, a timer expiration, each periodic timer expiration, etc.).

In response to the verification request 350, controller 304 may send the request message 352 (e.g., a request packet) towards UPF 322 of the private 5G network 300. UPF 322 is assigned to Zone 2 and has an active security function associated with Zone 2. Also, UPF 322 anchors the PDU session A of industrial device 340 assigned to Zone 2, the PDU session B of industrial device 342 assigned to Zone 2, and also the PDU session C of industrial device 344 assigned to Zone 3 (which is a discrepancy). The request message 352 that is addressed to UPF 322 may be communicated through the one or more network nodes 306. UPF 322 receives and processes the request message 352. UPF 322 processes the message by generating and sending back one or more response messages 354 to controller 304. The response message(s) 354 may include an identifier of industrial device 340 (Zone 2), an identifier of industrial device 342 (Zone 2), and an identifier of industrial device 344 (Zone 3) (a device having a discrepancy). Controller 304 may receive the response message(s) 354 and perform a verification process. Here, the zone value of the UPF 322 (i.e., Zone 2) will match the zone value of industrial device 340 (i.e., Zone 2) and the zone value of industrial device 342 (i.e., Zone 2), but will mismatch the zone value of industrial device 344 (i.e., Zone 3) (indicating a discrepancy).

Thus, the techniques and mechanisms described herein provide for the ability to audit and verify that 5G endpoints are assigned to a UPF that belongs to a given zone to which the endpoints are supposed to be assigned and that the UPF satisfies the security requirements that are required of it. The techniques and mechanisms described herein also provide for the ability to audit and verify that a UPF serving a particular zone does not have any 5G endpoints assigned to it that do not belong to the particular zone.

Figure 6:
FIG. 6 illustrates a hardware block diagram of a computing device that may perform functions associated with operations of a controller according to some implementations of the present disclosure.

FIG. 6 illustrates a hardware block diagram of a computing device 600 that may perform functions associated with operations discussed herein in connection with the techniques described in relation to the above figures. In various embodiments, a computing device, such as computing device 600 or any combination of computing devices 600, may be configured as any entity/entities as discussed for the techniques depicted in connection with the figures in order to perform operations of the various techniques discussed herein. In particular, computing device 600 may perform operations of a controller for operation in accordance with the method of FIGS. 4A-4B and/or FIGS. 5A-5B and/or associated techniques and mechanisms described herein.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Techniques and mechanisms for security zone compliance monitoring in mobile networks, such as industrial 5G networks, have been described herein.

In one illustrative example, a method which may be performed by a controller may involve sending a request message towards a UE which operates to communicate traffic in a session in a mobile network; receiving, from a user plane function which anchors the session of the UE, a response message which includes an identifier of the user plane function; and verifying whether a zone or security level value that is assigned to the user plane function matches a zone or security level value that is assigned to the UE. The method may further involve identifying a discrepancy between the zone or security level value that is assigned to the user plane function and the zone or security level value that is assigned to the UE; and based on the identifying, providing a notification indication to indicate the discrepancy. In some implementations, the method may further involve verifying whether a plurality of active security functions of the user plane function, which are applied in the session of the UE, satisfy a plurality of security requirements of the zone or security level value that is assigned to the UE.

In some implementations, each zone or security level value is or is based on a security level or SL value which is defined according to IEC 62443. In some further implementations, the sending the request message towards the UE comprises sending the request message that is addressed to the UE which is comprised of an IoT device or an IIoT device. In some implementations, the request and response messages are communicated based on a CPD protocol.

In some implementations, the response message from the user plane function may include the zone or security level value that is assigned to the user plane function. In other implementations, the method may further involve obtaining, from a repository function or an identity services engine, the zone or security level value that is assigned to the user plane function. In some implementations, the method may further involve obtaining, from the subscriber database or the identity services engine, the zone or security level value that is assigned to the UE.

In some implementations, the method may further involve receiving, from a user terminal, a message indicating a verification request for the UE, and performing the sending, the receiving, and the verifying in response to the verification request. In some other implementations, the method may involve automatically performing the sending, the receiving, and the verifying for each one of a plurality of UEs.

In another illustrative example, a method which may also be performed by a controller may involve sending a request message towards a user plane function of a mobile network; receiving, from the user plane function, one or more response messages which include a plurality of identifiers of a plurality of UEs having a plurality of sessions that are anchored at the user plane function; and for each one of the plurality of UEs: verifying whether the zone or security level value that is assigned to the UE matches a given zone or security level value that is assigned to the user plane function. The method may further involve identifying a discrepancy between the zone or security level value that is assigned to the UE and the given zone or security level value that is assigned to the user plane function; and based on the identifying, providing a notification indication to indicate the discrepancy. In some implementations, the method may further involve verifying whether a plurality of active security functions of the user plane function satisfy a plurality of security requirements of the zone or security level value that is assigned to the UE.

In some implementations, the UE may be an IoT or IIoT device. In some implementations, the zone or security level value that is assigned to the user plane function is or is based on an SL value which is defined according to IEC 62443.

In some implementations, the one or more response messages from the user plane function include the zone or security level value that is assigned to the user plane function. In some implementations, the method may further involve obtaining, from a subscriber database or an identity services engine, the zone or security level value that is assigned to the UE.

In some implementations, the method may further involve receiving, from a user terminal, a message indicating a verification request for the user plane function, and performing in response to the request the sending, the receiving, and the verifying. In other implementations, the method may involve automatically performing the sending, the receiving, and the verifying.

In relation to the above-described methods, a computing device may comprise one or more processors; one or more memory elements coupled to the one or more processors; one or more interfaces to connect to a mobile network for communication; instructions stored in the one or more memory elements, where the instructions are executable on the one or more processors for operation as a controller, including for performing the processing/messaging steps of the method(s) as described. In addition, a computer program product may comprise a non-transitory computer readable medium and instructions stored in the non-transitory computer readable medium, where the instructions are executable by one or more processors of controller for performing the processing/messaging steps of the method(s) as described.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), VLAN, wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6g), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combined multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
at a controller for managing a mobile network,
sending a verification request message towards a user equipment (UE) for verifying security zone compliance between the UE and a user plane function that anchors a session of the UE in which the UE operates to communicate traffic in the session in the mobile network;
receiving, from a particular user plane function that anchors the session of the UE, a response message which includes an identifier of the particular user plane function; and
verifying whether a zone or security level value that is assigned to the particular user plane function matches a zone or security level value that is assigned to the UE.

2. The method of claim 1, further comprising:
at the controller for managing the mobile network,
identifying a discrepancy between the zone or security level value that is assigned to the particular user plane function and the zone or security level value that is assigned to the UE; and based on the identifying, providing a notification indication to indicate the discrepancy.

3. The method of claim 1, further comprising:
at the controller for managing the mobile network,
verifying whether a plurality of active security functions of the particular user plane function, which are applied in the session of the UE, satisfy a plurality of security requirements of the zone or security level value that is assigned to the UE.

4. The method of claim 1, wherein the zone or security level value that is assigned to the particular user plane function is or is based on a security level (SL) value which is defined according to International Electrotechnical Commission (IEC) 62443.

5. The method of claim 1, wherein sending the verification request message towards the UE comprises sending the verification request message that is addressed to the UE comprising an Internet of Things (IoT) device or an industrial IoT (IIOT) device.

6. The method of claim 1, wherein the response message further includes the zone or security level value that is assigned to the particular user plane function.

7. The method of claim 1, further comprising:
at the controller for managing the mobile network,
obtaining, from a repository function or an identity services engine, the zone or security level value that is assigned to the particular user plane function.

8. The method of claim 1, further comprising:
at the controller for managing the mobile network,
obtaining, from a subscriber database or an identity services engine, the zone or security level value that is assigned to the UE.

9. The method of claim 1, further comprising:
at the controller for managing the mobile network,
receiving, from a user terminal, a message indicating a verification request for the UE, and performing the sending, the receiving, and the verifying in response to the verification request; or
automatically performing the sending, the receiving, and the verifying for each one of a plurality of UEs.

10. The method of claim 1, wherein the verification request message and response message are communicated based on a control point discovery (CPD) protocol.

11. The method of claim 1, wherein the verification request message is addressed to the UE and the particular user plane function is to intercept the verification request message addressed to the UE and disallow the verification request message from reaching the UE.

12. A computing device comprising:
one or more processors;
one or more memory elements coupled to the one or more processors;
one or more interfaces to connect to a mobile network for communication; and
instructions stored in the one or more memory elements, the instructions being executable on the one or more processors for:
sending a verification request message towards a user equipment (UE) for verifying security zone compliance between the UE and a user plane function that anchors a session of the UE in which the UE operates to communicate traffic in the session in the mobile network;
receiving, from a particular user plane function that anchors the session of the UE, a response message which includes an identifier of the particular user plane function; and verifying whether a zone or security level value that is assigned to the particular user plane function matches a zone or security level value that is assigned to the UE.

13. The computing device of claim 12, wherein the instructions are executable on the one or more processors further for:

identifying a discrepancy between the zone or security level value that is assigned to the particular user plane function and the zone or security level value that is assigned to the UE; and based on the identifying, providing a notification indication to indicate the discrepancy.

14. The computing device of claim 12, wherein the instructions are executable on the one or more processors further for:

verifying whether a plurality of active security functions of the particular user plane function, which are applied in the session of the UE, satisfy a plurality of security requirements of the zone or security level value that is assigned to the UE.

15. The computing device of claim 12, wherein the response message further includes the zone or security level value that is assigned to the particular user plane function.

16. A method comprising:

at a controller for managing a mobile network, sending a verification request message towards a user plane function of the mobile network for verifying security zone compliance between the user plane function and each of a plurality of user equipments (UEs) having a plurality of sessions that are anchored at the user plane function;

receiving, from the user plane function, one or more response messages which include a plurality of identifiers of the plurality of UEs having the plurality of sessions that are anchored at the user plane function; and for each UE of the plurality of UEs, verifying whether a zone or security level value that is assigned to each UE matches a given zone or security level value that is assigned to the user plane function.

17. The method of claim 16, further comprising:

at the controller for managing the mobile network, identifying a discrepancy between the zone or security level value that is assigned to at least one UE of the plurality of UEs and the given zone or security level value that is assigned to the user plane function; and based on the identifying, providing a notification indication to indicate the discrepancy.

18. The method of claim 16, further comprising:

at the controller for managing the mobile network, verifying whether a plurality of active security functions of the user plane function satisfy a plurality of security requirements of the zone or security level value that is assigned to each UE of the plurality of UEs.

19. The method of claim 16, further comprising:

for each UE one of the plurality of UEs, obtaining, from a subscriber database or an identity services engine, the zone or security level value that is assigned to each UE based on an identifier of each UE.

20. The method of claim 16, wherein the zone or security level value that is assigned to the user plane function is or is based on a security level (SL) value which is defined according to International Electrotechnical Commission (IEC) 62443.

\* \* \* \* \*